(12) United States Patent
Murata

(10) Patent No.: US 7,478,820 B2
(45) Date of Patent: Jan. 20, 2009

(54) TORSION BEAM SUSPENSION APPARATUS

(75) Inventor: Satoshi Murata, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 289 days.

(21) Appl. No.: 10/570,142

(22) PCT Filed: Sep. 29, 2005

(86) PCT No.: PCT/IB2005/003225

§ 371 (c)(1), (2), (4) Date: Mar. 1, 2006

(87) PCT Pub. No.: WO2006/038121

PCT Pub. Date: Apr. 13, 2006

(65) Prior Publication Data

US 2007/0075518 A1     Apr. 5, 2007

(30) Foreign Application Priority Data

Oct. 7, 2004   (JP)   .............................. 2004-294593

(51) Int. Cl.
*B60G 21/05* (2006.01)

(52) U.S. Cl. ................................. 280/124.106; 267/188

(58) Field of Classification Search .......... 280/124.166, 280/124.152, 124.107, 124.106; 29/897.2; 428/595; 52/731.6, 735.1; 228/173.4; 267/188, 267/183, 273; 72/370.23, 370.26, 379.2

See application file for complete search history.

(56) References Cited

U.S. PATENT DOCUMENTS

| | | | |
|---|---|---|---|
| 1,618,611 A * | 2/1927 | Trout ......................... | 138/142 |
| 3,144,069 A * | 8/1964 | Rutter et al. ............... | 72/379.2 |
| 3,724,153 A * | 4/1973 | Wessells et al. .......... | 296/203.03 |
| 4,512,700 A * | 4/1985 | Santoni ...................... | 413/4 |
| 4,739,918 A * | 4/1988 | Stokes et al. ............. | 228/173.6 |
| 5,520,407 A * | 5/1996 | Alatalo et al. ......... | 280/124.166 |
| 5,958,603 A * | 9/1999 | Ragland et al. ............. | 428/595 |
| 6,119,501 A * | 9/2000 | Hansen et al. ........... | 72/370.04 |

(Continued)

FOREIGN PATENT DOCUMENTS

DE          100 54 692 A1     5/2002

(Continued)

*Primary Examiner*—John Q. Nguyen
*Assistant Examiner*—Drew J. Brown
(74) *Attorney, Agent, or Firm*—Oliff & Berridge, PLC

(57) ABSTRACT

An axial-direction intermediate portion (21) of a torsion beam is pressed so as to have a substantially V-shape cross section. The axial direction intermediate portion (21) includes an outer wall (21a) and an inner wall (21b). Plural protrusions (21a1) (convex portions) formed on the outer wall (21a) are in contact with the inner wall (21b). The plural protrusions (21a1) are arranged at predetermined intervals on one straight line along an axial direction of the torsion beam. An inter-wall space (21c) having a width equivalent to a height of the protrusions (21a1) is formed between the outer wall (21a) and the inner wall (21b). The width of the inter-wall space (21c) is set to a predetermined value, considering torsional rigidity and a shear center position of the torsion beam. Since the outer wall (21a) and the inner wall (21b) are in contact with each other at the protrusions (21a1), it is possible to suppress occurrence of abnormal noise that is caused when the outer wall (21a) and the inner wall (21b) slidably contact each other.

5 Claims, 3 Drawing Sheets

U.S. PATENT DOCUMENTS

| | | |
|---|---|---|
| 6,276,044 B1 * | 8/2001 | Ragland et al. ............... 29/521 |
| 6,451,447 B1 * | 9/2002 | Ragland et al. ............. 428/593 |
| 6,523,841 B2 * | 2/2003 | Glaser et al. .......... 280/124.106 |
| 6,533,300 B1 * | 3/2003 | Hicks et al. ........... 280/124.106 |
| 6,616,157 B2 * | 9/2003 | Christophliemke et al. ................... 280/124.106 |
| 2001/0022099 A1 | 9/2001 | Ueno et al. |
| 2003/0044632 A1 | 3/2003 | Schonleber et al. |
| 2005/0035567 A1 * | 2/2005 | Ok et al. ............... 280/124.107 |
| 2007/0052194 A1 * | 3/2007 | Marchel ............. 280/124.166 |
| 2007/0069496 A1 * | 3/2007 | Rinehart et al. ....... 280/124.166 |

FOREIGN PATENT DOCUMENTS

| | | |
|---|---|---|
| DE | 101 02 759 A1 | 7/2002 |
| EP | 1 036 678 A2 | 9/2000 |
| FR | 2 851 958 A | 9/2004 |
| JP | A 2001-146110 | 5/2001 |
| JP | A 2001-321846 | 11/2001 |
| JP | A 2005-162080 | 6/2005 |

* cited by examiner

TORSION BEAM SUSPENSION APPARATUS

BACKGROUND OF THE INVENTION

1. Field of the Invention

The invention relates to a torsion beam suspension apparatus.

2. Description of the Related-Art

As disclosed in Japanese Patent Application Publication No. JP-A-2001-321846 and Japanese Patent Application Publication No. JP-A-2001-146110, a torsion beam suspension apparatus is known, in which a torsion beam is formed of a pipe having a cylindrical shape, and an axial-direction intermediate portion of the pipe is pressed so as to have a substantially V-shape cross section or a substantially U-shape cross section. In a torsion beam, a space (internal space) having a predetermined width is formed between an outer wall and an inner wall that constitute a double wall formed by pressing the pipe. In another torsion beam, an outer wall and an inner wall are in contact with each other, and a space is formed at each of both end portions having a circular arc shape, at which the outer wall and the inner wall are connected to each other.

In these torsion beams, it is possible to change torsional rigidity and a shear center position (torsional center position) when right and left wheels are displaced to opposite phases (in opposite directions) and the torsion beam is twisted, by adjusting a width of the space to a predetermined value, and changing the shape of the cross section. In a case where the torsional rigidity is changed, roll stiffness of the vehicle is changed. In a case where the shear center position is changed, a displacement amount and a displacement direction of trailing arms and the like are changed when the torsion beam is twisted. Thus a steering characteristic of the vehicle is changed.

Each of the aforementioned torsion beams is generally formed by press forming using an upper die and a lower die. In a case where the former torsion beam is formed, since the space having a predetermined width needs to be formed between the outer wall and the inner wall, the lower die cannot be pressed to the upper die during a forming process. That is, positioning of the lower die with respect to the upper die is likely to be insufficiently accurate. This causes variations in the shape of the cross section of the torsion beam. As a result, it is difficult to set the torsional rigidity to a predetermined value, and to set the shear center position to a predetermined position.

Meanwhile, in a case where the latter torsion beam is formed, since the outer wall and the inner wall are in contact with each other except the both end portions, it is possible to prevent the aforementioned variations in the shape of the cross section of the torsion beam. In this case, however, the outer wall and the inner wall are in surface contact with each other, the outer wall and the inner wall slidably contact each other when the torsion beam is twisted, which causes abnormal noise.

SUMMARY OF THE INVENTION

An embodiment of the invention seeks to provide a torsion beam suspension apparatus in which torsional rigidity and a shear center position of a torsion beam can be easily set to a predetermined value and a predetermined position, respectively, and occurrence of abnormal noise can be suppressed when the torsion beam is twisted.

According to an aspect of the invention, a torsion beam suspension apparatus includes a torsion beam which, in use, extends in a width direction of a vehicle, whose one end is connected to one of paired right and left trailing arms, and whose other end is connected to the other of the paired right and left trailing arms. In the torsion beam suspension apparatus, the torsion beam is formed of a pipe having a cylindrical shape; an axial-direction intermediate portion of the pipe is pressed so as to have a substantially V-shape cross section or a substantially U-shape cross section; a convex portion is formed on at least one of an outer wall and an inner wall that constitute a double wall formed by pressing the pipe, and the convex portion protrudes from one of the outer wall and the inner wall on which the convex portion is formed to the other of the outer wall and the inner wall on which the convex portion is not formed; and the outer wall and the inner wall are in contact with each other at the convex portion.

When the torsion beam is formed, for example, the lower die is moved toward the upper die until a portion of the pipe constituting the outer wall and a portion of the pipe constituting the inner wall contact each other at the convex portion. In this case, the lower die can be pressed to the upper die with the inner wall, the convex portion, and the outer wall being arranged between the lower die and the upper die. Therefore, the lower die is reliably positioned at substantially the same position as that of the upper die. Therefore, it is possible to prevent variations in the shape of the cross section of the axial-direction center portion of the torsion beam. At this time, a space having a width equivalent to a height of the convex portion is formed between the outer wall and the inner wall. Thus, the torsional rigidity of the torsion beam can be easily set to a predetermined value, and the shear center position can be easily set to a predetermined position by setting the height of the convex portion considering the torsional rigidity and the shear center position of the torsion beam.

Also, the outer wall and the inner wall are in contact with each other at the convex portion. Accordingly, a contact area between the outer wall and the inner wall is extremely small, as compared to a case where an outer wall and an inner wall are in surface contact with each other. Therefore, it is possible to suppress occurrence of abnormal noise when the torsion beam is twisted.

According to an embodiment of the invention, the convex portion includes plural protrusions that are arranged at predetermined intervals in an axial direction of the torsion beam. With this configuration, a contact area between the outer wall and the inner wall is small, for example, as compared to a case where an outer wall and an inner wall are continuously in contact with each other along the axial direction of the torsion beam. Therefore, it is possible to suppress occurrence of abnormal noise when the torsion beam is twisted. In this case, the plural protrusions are arranged at the predetermined intervals in the axial direction of the torsion beam. Accordingly, although the plural protrusions are provided, the shape of the cross section of the axial-direction intermediate portion of the torsion beam is not greatly changed on the whole. Therefore, the torsional rigidity and the shear center of the torsion beam are prevented from being sharply changed.

According to another embodiment of the invention, each of the plural protrusions is formed so as to have a substantially conical shape by plastically deforming the outer wall, and the plural protrusions are arranged on one straight line along the axial direction of the torsion beam. With this configuration, the contact area between the outer wall and the inner wall is made even smaller, it is possible to suppress occurrence of abnormal noise even more effectively when the torsion beam is twisted. Also, since the plural protrusions are arranged on one straight line along the axial direction of the torsion beam, the protrusions can be used for positioning of the torsion beam when the torsion beam is formed, and when the torsion beam is connected to the trailing arms. In this case, there is an advantage that a specific jig for positioning of the torsion beam is not necessary.

The invention also provides a vehicle comprising the torsion beam suspension apparatus wherein the torsion beam extends in a width direction of the vehicle.

BRIEF DESCRIPTION OF THE DRAWINGS

A better understanding of the invention will become apparent from the following illustrative description of embodiments with reference to the accompanying drawings, wherein like numerals are used to represent like elements and wherein.

DETAILED DESCRIPTION OF EMBODIMENTS

Figure 1:
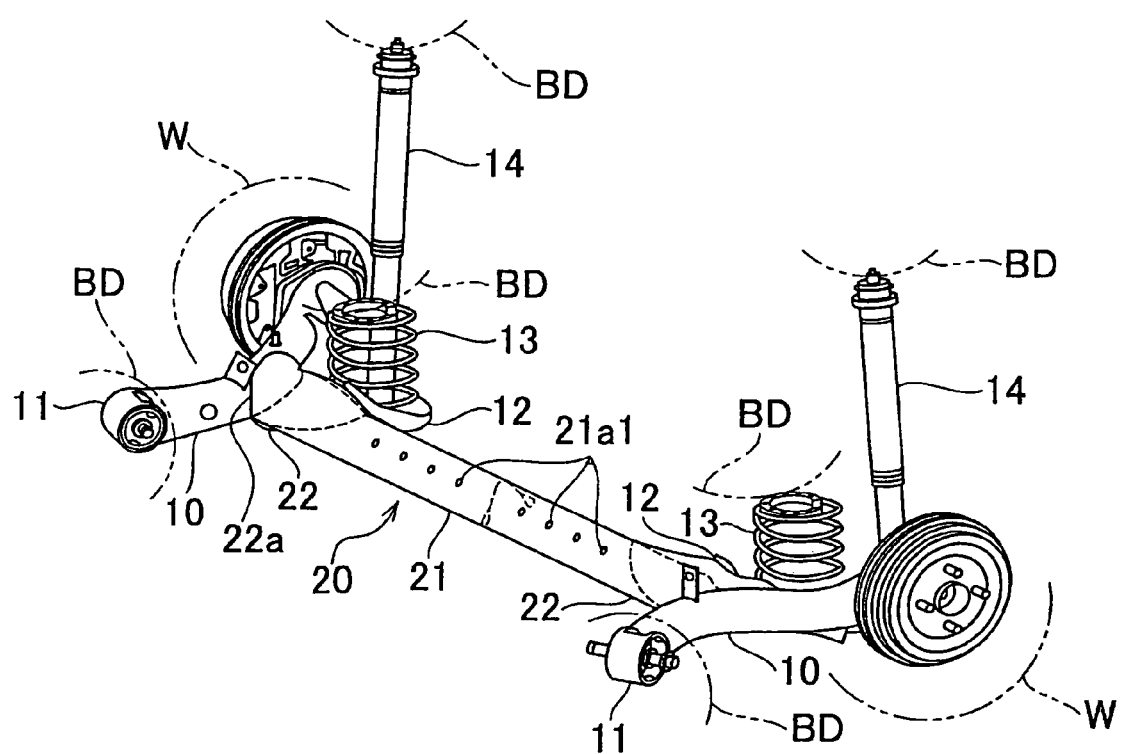
FIG. 1 is a perspective view showing a torsion beam suspension apparatus according to an embodiment of the invention.

Hereinafter, an embodiment of the invention will be described with reference to the drawings. FIG. 1 shows an entire torsion beam suspension apparatus according to the embodiment of the invention. The torsion beam suspension apparatus includes a pair of right and left trailing arms 10, 10; and a torsion beam 20.

Each of the trailing arms 10, 10 is formed of a curved pipe having a cylindrical shape. Front end portions of the trailing arms 10, 10 are fitted to a vehicle body BD via bushes 11, 11 such that the trailing arms 10, 10 can be rotated around a substantially horizontal axis. Rear end portions of the trailing arms 10, 10 are fitted to wheels W, W, respectively, via wheel-side members such as carriers (not shown). Spring seats 12, 12 are welded to rear inner walls of the trailing arms 10, 10, respectively. Bottom walls of the spring seats 12, 12 support coil springs 13, 13, respectively. Upper ends of the coil springs 13, 13 support the vehicle body BD. Shock absorbers 14, 14 are provided behind the coil springs 13, 13, respectively. The shock absorbers 14, 14 are rotatably supported by brackets welded to the trailing arms 10, 10, via support rings at lower ends of the shock absorbers 14, 14. Upper ends of the shock absorbers 14, 14 support the vehicle body BD.

The torsion beam 20 extends in a width direction of the vehicle. The torsion beam 20 is formed of a pipe having a cylindrical shape. An axial-direction center portion 21 of the torsion beam 20 is pressed so as to have a double wall having a substantially V-shape cross section (refer to FIG. 2). Axial-direction outer portions 22, 22 of the torsion beam 20 are formed so as to have a cylindrical shape, and to have a slightly deformed circle cross section. Connection portions 22a, 22a are formed at both ends of the torsion beam 20. The connection portions 22a, 22a are cut into predetermined shapes so as to be fitted to outer peripheral surfaces of intermediate portions of the trailing arms 10, 10, respectively. The torsion beam 20 is connected to the trailing arms 10, 10 at the connection portions 22a, 22a, respectively, by welding or the like.

Figure 2:
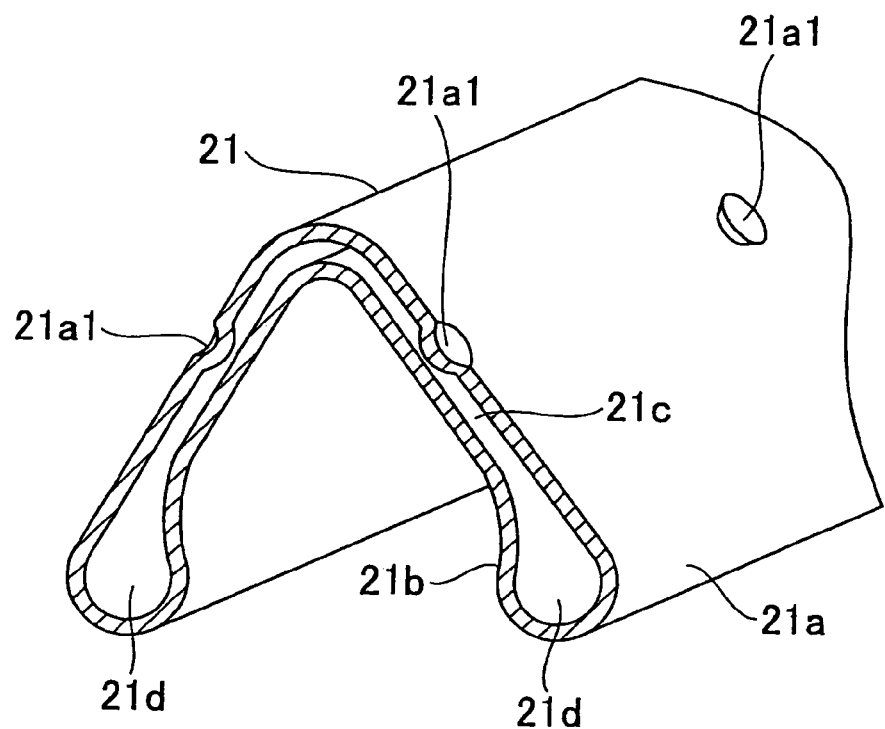
FIG. 2 is a perspective view showing an axial-direction intermediate portion of the torsion beam shown in FIG. 1.
Figure 3:
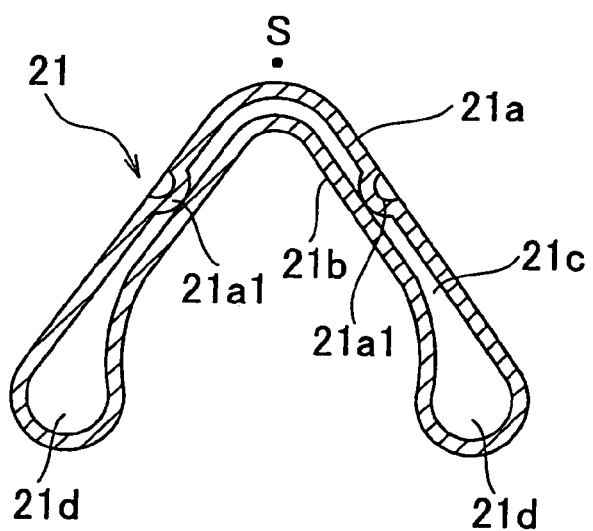
FIG. 3 is a cross sectional view showing the axial-direction intermediate portion of the torsion beam shown in FIG. 1.

The double wall includes an outer wall 21a and an inner wall 21b, as shown in FIG. 2 and FIG. 3. The outer wall 21a and the inner wall 21b are pressed so that an inter-wall space 21c having a substantially uniform width is formed between the outer wall 21a and the inner wall 21b from a top portion to each of intermediate portions on a front side and on a rear side. The outer wall 21a and the inner wall 21b are connected with each other at both end portions on the front side and on the rear side such that end portion spaces 21d, 21d are formed at the both end portions, and each of the both end portions has a circular arc shape. Each of the end portion spaces 21d, 21d is larger than the inter-wall space 21c. The end portion spaces 21d, 21d are continuous with the inter-wall space 21c. A width of each of the end portion spaces 21d, 21d is increased toward the corresponding end portion on the front side or on the rear side.

A width of each of the inter-wall space 21c and the end portion spaces 21d, 21d is set to a predetermined value such that torsional rigidity of the torsion beam 20 become a predetermined value and a shear center position S becomes a predetermined position when the right and left wheels W, W are displaced to opposite phases (in vertically opposite directions) and the torsion beam 20 is twisted through the trailing arms 10.

Plural protrusions 21a1 are formed at predetermined intervals on one straight line along the axial direction of the torsion beam 20 on each of a front surface and a rear surface of the outer wall 21a. Each of the protrusions 21a1 is formed by plastically forming a depressed portion having a substantially conical shape on the outer wall 21a Each of the protrusions 21a protrudes toward the inner wall 21b. After the axial-direction intermediate portion 21a of the torsion beam 20 is pressed, the protrusions 21a1 on the outer wall 21a are in contact with the inner wall 21b. That is, since the protrusions 21a1 on the outer wall 21a are in contact with the inner wall 21b, the inter-wall space 21c is formed. The width of the inter-wall space 21c is specified by a height of the protrusions 21a1.

In the aforementioned embodiment thus configured, in a case where the torsion beam 20 is formed, first, the protrusions 21a1 are formed in advance in a portion of a pipe constituting the outer wall 21a. Next, for example, the lower die is moved toward the upper die until the portion of the pipe constituting the outer wall 21a and the portion of the pipe constituting the inner wall 21b contact each other at the protrusions 21a1. Thus, the axial-direction intermediate portion 21 of the torsion beam 20 is formed so as to have a substantially V-shape cross section. In addition, the inter-wall space 21c having the width equivalent to the height of the protrusions 21a1, and the end portion spaces 21d, 21d having the predetermined width are formed between the outer wall 21a and the inner wall 21b that are formed by pressing the pipe.

In the aforementioned embodiment, when the torsion beam 20 is formed, the lower die can be pressed to the upper die with the inner wall 21b, the protrusions 21a1, and the outer wall 21a being arranged between the lower die and the upper die. Therefore, the lower die is reliably positioned at substantially the same position as that of the upper die. Therefore, it is possible to prevent variations in the shape of the cross section of the axial-direction center portion 21 of the torsion beam 20. Thus, the torsional rigidity of the torsion beam 20 can be easily set to the predetermined value, and the shear center position S can be easily set to the predetermined position.

Also, in the aforementioned embodiment, the plural protrusions 21 on the outer wall 21a are in contact with the inner wall 21b. Accordingly, a contact area between the outer wall 21a and the inner wall 21b is extremely small, as compared to a case where an outer wall and an inner wall are in surface contact with each other. Therefore, it is possible to suppress occurrence of abnormal noise when the torsion beam 20 is twisted. In the aforementioned embodiment, the plural protrusions 21a1 are arranged at the predetermined intervals in the axial direction of the torsion beam 20. Therefore, although the plural protrusions 21a1 are provided, the shape of the cross section of the axial-direction intermediate portion of the torsion beam 20 is not greatly changed on the whole. Thus, the torsional rigidity and the shear center of the torsion beam 20 are prevented from being sharply changed.

Also, in the aforementioned embodiment, the plural protrusions 21a1 are arranged on one straight line along the axial direction of the torsion beam 20 on each of the front surface and the rear surface of the outer wall 21a. Thus, the protrusions 21a1 can be used for positioning of the torsion beam 20 when the torsion beam 20 is formed, and when the torsion beam 20 is connected to the trailing arms 10, 10. In this case, a specific jig for positioning of the torsion beam 20 is not necessary.

Although the embodiment of the invention has been described, the invention is not limited to the aforementioned embodiment, and various modifications can be made without departing from the true spirit of the invention.

Figure 4:
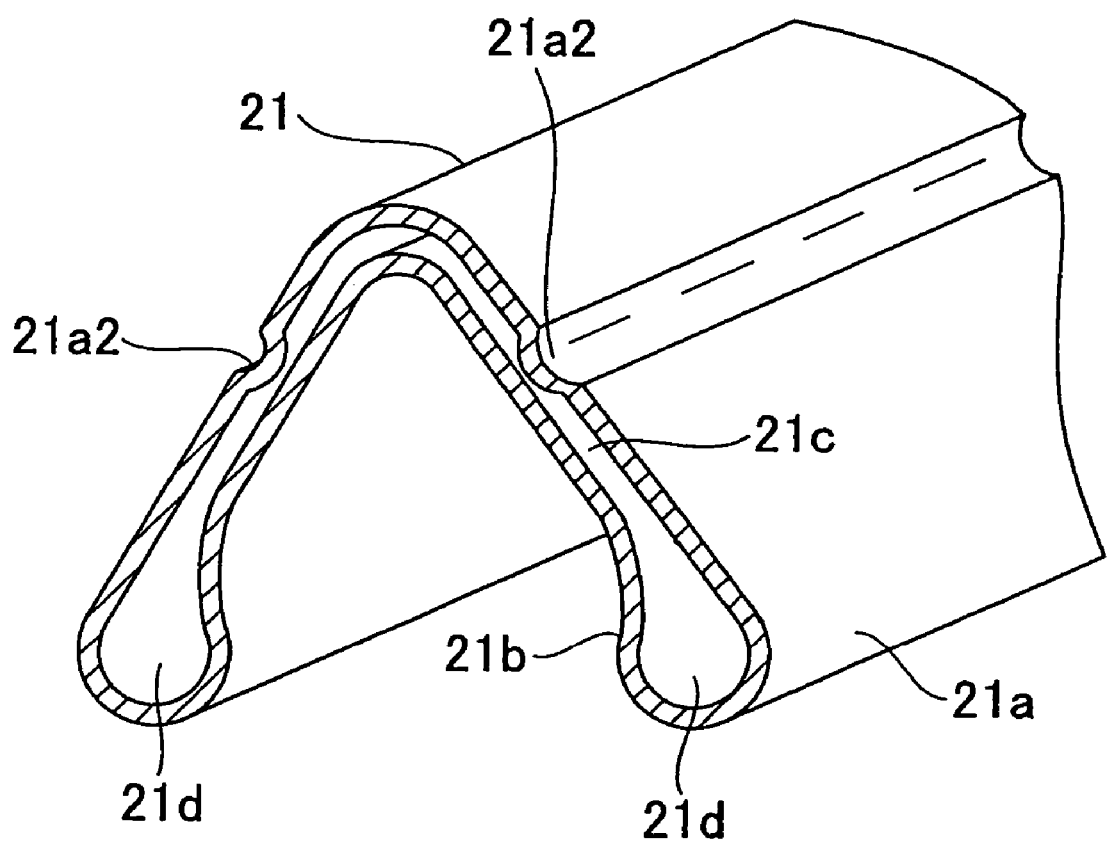
FIG. 4 is a perspective view showing an axial-direction intermediate portion of a torsion beam according to a modified example of the embodiment of the invention.

For example, in the aforementioned embodiment, the plural protrusions 21a1 in the substantially conical shape, which serve as convex portions, are formed at the predetermined intervals on one straight line along the axial direction of the torsion beam 20 on the outer wall 21a. However, the invention is not limited to this configuration. For example, the shape and the axial-direction length of each protrusion may be appropriately changed. That is, for example, each protrusion may have an oval shape or an oblong hole shape. Also, for example, protrusions may be arranged in a zigzag manner along the axial direction of the torsion beam 20. Also, for example, as shown in FIG. 4, each of protrusions 21a2 having a continuous linear shape may be formed on one straight line along the axial direction of the torsion beam 20. In each of these cases, the inter-wall space is formed, as well as in the aforementioned embodiment. Therefore, it is possible to easily set the torsional rigidity and the shear center position of the torsion beam, and to suppress occurrence of abnormal noise when the torsion beam is twisted. Also, in each of the aforementioned embodiment and various modified examples, the protrusions 21a1 are formed in the portion of the pipe constituting the outer wall 21a. However, in addition to the protrusions 21a1, or instead of the protrusions 21a1, protrusions may be formed in the portion of the pipe constituting the inner wall 21b. In this case as well it is possible to obtain the same effect as the effect obtained in each of the aforementioned embodiment and the modified examples.

Also, in each of the aforementioned embodiment and the various modified examples, the protrusions are formed by plastically deforming the pipe. However, the invention is not limited to the protrusions that are formed in this manner. For example, a protrusion member equivalent to the aforementioned protrusion may be fitted to an outer wall and/or an inner wall such that the outer wall and the inner wall are in contact with each other at the protrusion member. In this case as well, it is possible to obtain the same effect as the effect obtained in each of the aforementioned embodiment and the modified examples.

The invention claimed is:

1. A torsion beam suspension apparatus comprising:
a torsion beam which, in use, extends in a width direction of a vehicle;
a right trailing arm connected to one end of the torsion beam; and
a left trailing arm connected to other end of the torsion beam;
wherein:
the torsion beam is formed of a pipe having a cylindrical shape;
an axial-direction intermediate portion of the pipe is pressed so as to have a substantially V-shape cross section or a substantially U-shape cross section;
a convex portion is formed on at least one of an outer wall and an inner wall that constitute a double wall formed by pressing the pipe, and the convex portion protrudes from one of the outer wall and the inner wall on which the convex portion is formed to the other of the outer wall and the inner wall on which the convex portion is not formed; and
the outer wall and the inner wall are in movable contact with respect to each other at the convex portion.

2. The torsion beam suspension apparatus according to claim 1, wherein the convex portion includes plural protrusions that are arranged at predetermined intervals in an axial direction of the torsion beam.

3. The torsion beam suspension apparatus according to claim 2, wherein each of the plural protrusions is formed so as to have a substantially conical shape by plastically deforming the outer wall, and the plural protrusions are arranged on one straight line along the axial direction of the torsion beam.

4. The torsion beam suspension apparatus according to claim 1, wherein the convex portion includes a protrusion which has a continuous linear shape, and which is arranged on one straight line along the axial direction of the torsion beam.

5. A vehicle comprising a torsion beam suspension apparatus according to claim 1 extending width-wise of the vehicle.

* * * * *